Nov. 22, 1938.  F. STEDRONSKY  2,137,860
COLLAPSIBLE VEHICLE RUNNER
Filed April 3, 1937
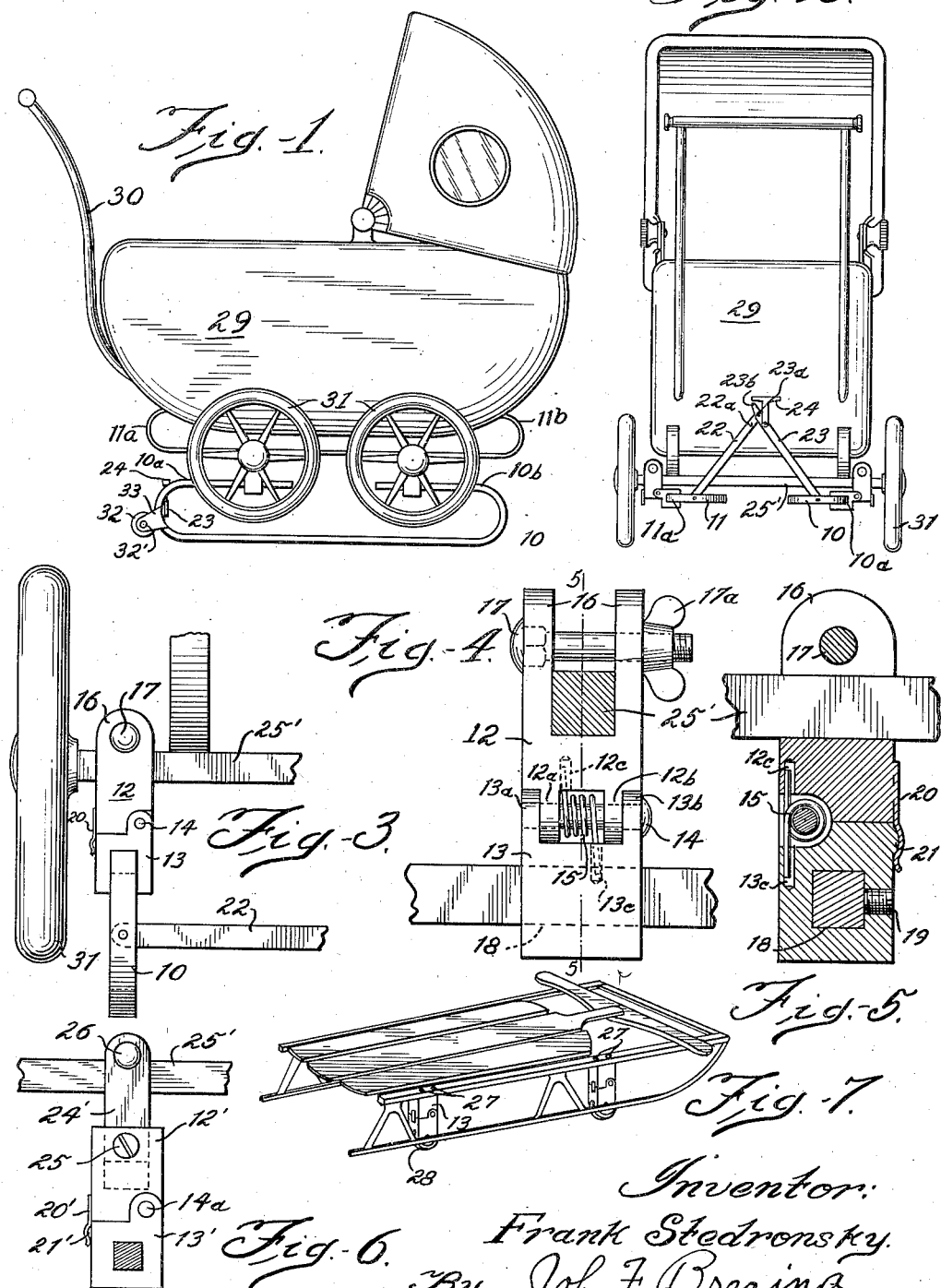
Inventor:
Frank Stedronsky.
By John F. Brezina
Atty.

Patented Nov. 22, 1938

2,137,860

UNITED STATES PATENT OFFICE 2,137,860

COLLAPSIBLE VEHICLE RUNNER

Frank Stedronsky, Cicero, Ill.

Application April 3, 1937, Serial No. 134,800

9 Claims. (Cl. 280—8)

My invention relates to improvements in attachable or detachable runners, and in the novel mounting means therefore, adapted to be placed on a vehicle, as for example, on a baby carriage, to convert the same into a sled or sleigh. More particularly, my invention consists in the novel means of forming the runners; in the construction and operation of attachable and detachable mounting means whereby the runners may be quickly and easily attached to various vehicles, and whereby the positions of the said attaching or mounting means may be quickly changed to adjust the same for and to fit the particular axles and distances between said axles of various vehicles.

A further object of my invention is to provide a novel mounting means for quickly attaching a pair of sled runners or the like to a vehicle such as a baby carriage whereby the runners may be quickly moved into or out-of ground engaging position, and whereby said runners will be held in elevated transversely extending position out of contact with the ground when their use is not desired.

A further object of my invention is the provision of an invention comprising the combination of pivotally mounted runners; novel hinged mounting elements therefore which permit quick and easy pivotal movement of the runners into or out of the ground-engaging position, and which includes adjustable means for varying the length of said mounting means and consequently varying the distance between the vehicle axles and the runners themselves.

Fig. 1 is a side elevational view of a typical vehicle and the sled runner device of my invention attached thereto and in ground-engaging position.

Fig. 2 is a rear elevational view showing the sled runner device of my invention in elevated non-operative position.

Fig. 3 is an enlarged fragmentary view taken from the rear and showing the mounting of the hinge elements with respect to a vehicle axle.

Fig. 4 is an enlarged partially fragmentary and elevational view taken from the side of the hinge mounting elements, and showing the spring therein.

Fig. 5 is a cross-sectional view taken on line 5—5 of Fig. 4.

Fig. 6 is an elevational view of a slightly modified form of adjustable hinge mounting element of my invention.

Fig. 7 is a perspective view illustrating one manner in which the hinge mounting element may be attached with respect to a conventional sled to convert the same into a wheel supported unit.

Referring to the drawing, reference numerals 10 and 11 indicate a pair of sled runners, each thereof formed of an integral metal bar or band and having its opposite ends bent back to form gradually rounded U-shaped bends and the ends lying in planes parallel to the ground engaging portion of the sled runner. Said bent-back ends are indicated by reference numerals 10—a, 10—b, 11—a, and 11—b respectively.

The means for adjustably and releasably attaching said sled runners to a conventional carriage 29, or similar vehicle which has upwardly extended handle bars 30 and wheels 31, usually propelled or pushed by hand, comprises a plurality, preferably four in number, of hinged mounting block or hinge elements, each whereof are designated as composed of two co-operating hinged-together upper and lower sections 12 and 13 respectively. The lower hinged section 13 has a pair of integral apertured knuckles 13a and 13b, and upper hinge block section 12 has co-operating integral apertured knuckles 12a and 12b respectively, and spaced apart as clearly shown in Fig. 4. The co-operating knuckles of said respective hinge block sections are hingedly joined by pintle 14, and a spring 15 of suitable temper is mounted about the central portion of said pintle and its opposite ends project into and engage respectively in aperture 12c and in aperture 13c form in aforesaid upper and lower hinged lock sections 12 and 13, as clearly shown in Fig. 4. Said spring 15 is so stretched and mounted that it will normally tend to open and hold separated the said respective hinge sections 12 and 13, as shown in Fig. 5.

The upper end of hinge block section 12 is bifurcated to form projecting ears 16, which are suitably apertured for the reception of a suitable bolt 17 having a correspondingly threaded wing nut 17a to provide for securely fastening the same upon a vehicle axle as clearly shown in the drawing. The lower hinge block section 13 has a transversely extending aperture 18 therethrough, which is illustrated in the drawing as rectangular and which should be of such size to enable the respective ends of the sled runner itself to be snugly fitted thereon. A suitable threaded set screw, 19, is provided in a suitably threaded aperture formed in the side of lower hinge block section 13, to provide for stationary positioning of each of the said hinge elements with respect to the runner and to suit the particular distance between the axles of the vehicle to which the attachment is made.

It is to be noted that the hinge block elements described above are so positioned that the respective runners mounted and suspended thereon will pivot toward each other and into substantial horizontal position as illustrated in Fig. 2. When the hinge block sections are in lowered position as illustrated in Figs. 4 and 5, the same are preferably held in such position by engagement of a suitable spring-like tongue or clip 20, the upper ends of which are welded or otherwise suitably secured to the upper section 12 of said hinge element and the lower yieldable portion of which snaps into and yieldably engages a relatively short integral projecting stud 21 on lower hinge lock section 13 to thereby releasably lock said sections together. Said runners not only perform the function of converting a vehicle to a sled or sleigh, but also provide quickly usable non-tipping means when it is desired to park the carriage indoors or outdoors and insuring against accidental tipping thereof.

A pair of levers 22 and 23 have their adjacent overlapping ends pivoted together as clearly shown in 23—a of Fig. 2 and have their respective opposite ends pivoted to the sled runners 10 and 11 respectively, more particularly to the integral bosses formed on the inside surface of the rear bends of said runners 10 and 11 respectively. Said levers 22 and 23 are of such length that they form a continuous horizontal connection when the sled runners are in ground-engaging position, the lever 23 preferably having a short projecting end adjacent the point of its pivotal connection with lever 22, indicated by reference numeral 23—b, which engaged a suitable projection 22—a on lever 22 to stop movement thereof below a horizontal plane.

A metal step 24 having suitable downwardly extending portions is pivoted to lever 23 at a point immediately adjacent the pivot 23—a, and normally extends upwardly so that when it is desired to lower the runners into ground engaging, or non-tipping position, the user merely steps thereon to move said toggle levers 22 and 23 into aligned position, the user simultaneously tipping the vehicle firstly on one side and thence on the other to position said runners in a vertical plane.

It is to be noted that while the hinge mounting element composed of sections 12 and 13 is, in the particular illustration of the drawing shown as a solid unit, that the same could likewise be formed by stamping, shearing, die-cutting, punching and bending of suitable sheet metal, to thereby make a lighter weight unit, any one of which well known steps of manufacture would obviously be the exercise of merely mechanical skill over that illustrated in the drawing, and also, obviously, a unit being formed of sheet metal stock and having similar characteristics would be within mechanical equivalents of the specific illustration drawn and within the claims appended hereto.

Referring to Fig. 6, which is a fragmentary view of a slightly modified form of hinge mounting element, 13', designates the lower hinged section of the block; 12' designates the upper section of the block hinged to section 13' by pintle 14—a. A similar yieldable fastening clip 20' engaging stud 21' on the lower section is adapted to normally maintain said hinge element section in the position of Fig. 6. The pintle 14a is of construction identical to pintle 14 of Figs. 4 and 5 and has a spring 15 similarly mounted and positioned thereabout and engaging the portions 12' and 13' in the same manner as shown in Fig. 5. In this form, the upper metal section 12' is hollow and has a vertical passage therethrough as shown in dotted lines, and the upper portion or anchoring bar 24' has its lower end slidably mounted within and with respect to section 12' and held in any one of a number of projected adjustable positions by means of set screw 25 which threads in a suitable aperture in section 12' and engages said anchoring bar 24'. The upper end of anchoring bar 24' is anchored to axle 25' by any suitable means, such as for example by bolt 26.

It will be apparent that this adjustable and extensible form of hinge mounting element will permit the mounting of the runners to suit the particular height of the vehicle axles and to suit the users' desire.

Referring to Fig. 1, numeral 33 represents a U shaped bracket which is secured to the rear bend of each of the runners 10 and 11 and in a position a short distance above the plane of said runners, as by welding, by rivets or the like. Said U shaped brackets are apertured, and caster wheels 32 are journaled on a suitable pin, 32', which is secured in said brackets 33 respectively. This permits the user to tip the front portions of the vehicle upwardly when stretches of bare ground are encountered and in which position casters 32 will roll on the ground and permit easy pushing of the vehicle until it is desired to again let the same rest on the runners themselves.

Referring to Fig. 7, I have illustrated the adaptation of the hinged mounting element previously described to a different use, that being by mounting the hinge element illustrated in Figs. 4 and 5 in inverted position adjacent four corners of a sled, each of said hinged mounting elements being secured with respect to the upper longitudinal truss bars by means of pairs of suitable screws 27 which pass through said truss bars and into engagement with the hinged element section 13 which have suitably threaded apertures to receive said screws 27. In this position, the bifurcated end 16 permits the journaling of a caster wheel 28 on each thereof, particularly on bolt 17. It will be noted that said inverted hinge elements and their journaled caster wheels are pivoted forwardly when it is desired to move them out of operative position. It will be readily apparent that this construction permits quick and easy conversion of a conventional sled into a coaster or glider for use on hard surfaces such as walks.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a device of the class described, a pair of spaced apart runners having their opposite ends bent backwardly and over the main portion of said runners; means for mounting said runners for pivotal movement transversely of said vehicle comprising a plurality of hinge elements, each of said hinge elements including upper and lower cooperating sections, a pivot connecting said sections together, a spring on said pivot having its projecting opposite ends engaging said upper and lower sections and normally holding the same in position to extend said runners horizontally, each of said runners being releasably secured to the lower sections of a pair of said hinge elements, the upper sections of said hinge elements being securable to vehicle axles, the pivotal movement of said runners permitting elevation of said runners into horizontal non-operating position, and adjustable screws threaded in said lower block sections for engaging said runners respectively, and releasable means for normally holding said block sections together.

2. In a device of the class described, a pair of spaced apart runners having their opposite ends bent backwardly and over the main portion of said runners; means for mounting said runners for pivotal movement transversely of said vehicle comprising a plurality of hinge elements, each of said hinge elements including upper and lower cooperating sections, and a pintle connecting said sections together; adjusting screws threaded in said lower sections for releasably securing said lower sections to a pair of said hinge elements, springs on each said pintles for normally holding said blocks in separated position and said runners in horizontally extending position, the upper sections of said hinge elements being securable to vehicle axles, the pivotal movement of said runners permitting elevation of said runners into horizontal non-operating position; yieldable fastening elements on each said hinge elements for releasably securing the upper and lower block sections in position to normally hold said runners in ground-engaging position, and a pair of toggle levers having adjacent ends pivoted together and their opposite ends pivoted to said runners respectively whereby depression of said levers will position said runners in ground-engaging position.

3. In a device of the class described, a pair of spaced apart ground-engaging runners adapted to be mounted on a vehicle, each said runners having their ends bent to form a hook-like end; means for mounting said runners for pivotal arcuate movement with respect to a vehicle comprising a pair of hinge elements slidably attached to each said runners, each said hinge elements comprising an upper and a lower section hinged together, the upper section being attachable to the axles of a vehicle and the lower hinge element section being slidably and adjustably mounted on said runners respectively; and interlocking fastening means on said upper and lower hinge element sections adapted to hold said runners in ground-engaging position, and spring means for normally elevating said runners into non-operative position when said fastening means is released.

4. In a device of the class described, a pair of spaced apart ground-engaging runners adapted to be mounted on a vehicle, each said runners having their ends bent to form a hook-like end; means for mounting said runners for pivotal arcuate movement with respect to a vehicle comprising a pair of hinge elements slidably attached to each said runners, each said hinge elements comprising an upper and a lower section hinged together, the upper section being bifurcated and attachable to the axles of a vehicle, and the lower hinge element section being slidably and adjustably mounted on said runners respectively, a thumb screw in the bifurcated end of said upper hinge element section, and interlocking fastening means on said upper and lower hinge element sections adapted to hold said runners in ground-engaging position.

5. In a device of the class described, a pair of spaced apart ground-engaging runners adapted to be mounted on a vehicle, each said runners having their ends bent to form a hook-like end; means for mounting said runners for pivotal arcuate movement with respect to a vehicle comprising a pair of hinge elements slidably attached to each said runners, each said hinge elements comprising an upper and a lower section hinged together, the upper section being attachable to the axles of a vehicle and the lower hinge element section being slidably and adjustably mounted on said runners respectively; releasable means for securing the lower hinge element sections in desired position on the ends of said runners and whereby said blocks may be moved longitudinally to coincide with the axles of the vehicle, and interlocking fastening means on said upper and lower hinge element sections adapted to hold said runners in ground-engaging position.

6. In pivotal mounting means for sled runners or the like, a plurality of hinged mounting blocks, each said block comprising a pair of sections hingedly connected together; one of said sections having a bifurcated end, means for securing said bifurcated sections to a vehicle; said bifurcated section being slidable with respect to said runner to permit its positioning at any desired place therein; the other of said hinged mounting block sections being releasably attachable to a ground-engaging runner or the like, said hinged block permitting pivotal movement of a runner into and out of ground-engaging position, a pair of toggle levers having their adjacent ends pivoted together and their opposite ends pivoted on the rear of said runners respectively, the upward pivoting movement of said runners being adapted to pivot said levers into angular position, said levers being adapted to hold said runners in ground-engaging vertical position when lowered.

7. In a device of the class described, a pair of spaced apart ground-engaging runners adapted to be mounted on a vehicle, each said runners having their ends bent to form a hook-like end; means for mounting said runners for pivotal arcuate movement with respect to a vehicle comprising a pair of hinge elements each said hinge elements comprising an upper and a lower section hinged together, the upper section comprising two interfitting telescopic members adjustably secured together whereby the same may be lengthened or shortened, the upper of said members being bifurcated and attachable to the axles of a vehicle, and the lower hinge element section being slidably and adjustably mounted on said runners respectively, and spring means for normally holding said runners in upraised non-operating position.

8. In a device of the class described, a pair of spaced apart ground-engaging runners adapted to be mounted on a vehicle, each said runners having their ends bent to form a hook-like end; means for mounting said runners for pivotal arcuate movement with respect to a vehicle comprising a pair of hinge elements slidably attached to each said runners, each said hinge elements comprising an upper and a lower section hinged together, the upper section being attachable to the axles of a vehicle and the lower hinge element section being slidably and adjustably mounted on said runners respectively; spring means on said hinge elements for automatically moving said hinge elements and runners out of contact and above the ground, interlocking fastening means on said upper and lower hinge element sections adapted to hold said hinge elements and runners in ground-engaging position; and manually actuable pivotally connected levers connecting said runners and adapted, when raised, to elevate said runners into non-operating position.

9. In a device of the class described, a chassis frame, a pair of runners; pivotal mounting means for mounting said runners with respect to said chassis frame, comprising a plurality of hinge elements, each hinge element including upper and lower cooperating sections hinged together adjacent one edge, both of said lower hinge element sections being attachable to said runners respectively, each of said upper hinge element sections comprising a pair of interfitting cooperating portions adjustable and extensible with respect to each other, set screws threaded in one of said interfitting portions of said upper hinge sections respectively for securing such interfitting portions in desired relative position; springs on said hinge elements normally tending to hold said elements in elevated non-operative position; and cooperating fastening elements on said hinge elements for holding the sections thereof together and in position to hold the runners in engagement with the ground.

FRANK STEDRONSKY.